United States Patent
Ma et al.

(10) Patent No.: US 11,664,495 B2
(45) Date of Patent: May 30, 2023

(54) NEGATIVE ELECTRODE PLATE, SECONDARY BATTERY, BATTERY MODULE, BATTERY PACK, AND APPARATUS

(71) Applicant: Contemporary Amperex Technology Co., Limited, Ningde (CN)

(72) Inventors: Jianjun Ma, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 409 days.

(21) Appl. No.: 17/051,187

(22) PCT Filed: Oct. 14, 2019

(86) PCT No.: PCT/CN2019/111049
§ 371 (c)(1),
(2) Date: Oct. 28, 2020

(87) PCT Pub. No.: WO2020/088231
PCT Pub. Date: May 7, 2020

(65) Prior Publication Data
US 2021/0135200 A1 May 6, 2021

(30) Foreign Application Priority Data
Oct. 31, 2018 (CN) .......................... 201811284003.7

(51) Int. Cl.
*H01M 4/36* (2006.01)
*H01M 4/133* (2010.01)
(Continued)

(52) U.S. Cl.
CPC .......... *H01M 4/366* (2013.01); *H01M 4/133* (2013.01); *H01M 4/587* (2013.01);
(Continued)

(58) Field of Classification Search
None
See application file for complete search history.

(56) References Cited

U.S. PATENT DOCUMENTS

| | | |
|---|---|---|
| 2007/0092797 A1 | 4/2007 | Konishiike et al. |
| 2008/0057401 A1 | 3/2008 | Mori et al. |

(Continued)

FOREIGN PATENT DOCUMENTS

| | | |
|---|---|---|
| CN | 101202338 A | 6/2008 |
| CN | 103250279 A | 8/2013 |

(Continued)

OTHER PUBLICATIONS

Machine language translation of KR20120040430 (Year: 2012).*
(Continued)

*Primary Examiner* — Wyatt P McConnell
(74) *Attorney, Agent, or Firm* — East IP P.C.

(57) ABSTRACT

This application provides a negative electrode plate, a secondary battery, a battery module, a battery pack, and an apparatus. The negative electrode plate includes a negative current collector and a plurality of active substance layers on the negative current collector. The plurality of active substance layers include at least a first active substance layer and a second active substance layer. The first active substance layer includes a first negative active substance, and the second active substance layer includes a second negative active substance. A ratio of gram capacity of the negative active substance of the first active substance layer to thickness of the first active substance layer is 3.5-10.0. A ratio of gram capacity of the negative active substance of the second active substance layer to thickness of the second active substance layer is 6.5-23.0.

19 Claims, 2 Drawing Sheets

(51) Int. Cl.
  *H01M 4/587*  (2010.01)
  *H01M 10/0525*  (2010.01)
  *H01M 4/02*  (2006.01)

(52) U.S. Cl.
  CPC .................. *H01M 10/0525* (2013.01); *H01M 2004/021* (2013.01); *H01M 2004/027* (2013.01); *H01M 2220/20* (2013.01)

(56) References Cited

U.S. PATENT DOCUMENTS

| 2019/0305357 | A1* | 10/2019 | Chu ...................... H01M 4/485 |
| 2022/0293924 | A1* | 9/2022 | Kalisvaart ............. H01M 4/134 |

FOREIGN PATENT DOCUMENTS

| CN | 103633293 | A | 3/2014 |
| CN | 103872339 | A | 6/2014 |
| CN | 104321912 | A | 1/2015 |
| CN | 105470460 | A | 4/2016 |
| CN | 108666525 | A | 10/2018 |
| JP | 2008059999 | A | 3/2008 |
| JP | 2014120404 | A | 6/2014 |
| KR | 20120040430 | A | 4/2012 |

OTHER PUBLICATIONS

The First Office Action for CN Application No. 202110585547.2, dated Apr. 8, 2022, 8 pages.
The First Examination Report for EP Application No. 19880120.1, dated Mar. 9, 2022, 3 pages.
The International search report for PCT Application No. PCT/CN2019/111049, dated Jan. 15, 2020, 13 pages.
The First Office Action for China Application No. 201811284003.7, dated Sep. 22, 2020, 6 pages.
The Second Office Action for China Application No. 201811284003.7, dated Dec. 29, 2020, 4 pages.
The extended European search report for EP Application No. 19880120.1, dated Sep. 8, 2021, 17 pages.

* cited by examiner

NEGATIVE ELECTRODE PLATE, SECONDARY BATTERY, BATTERY MODULE, BATTERY PACK, AND APPARATUS

CROSS-REFERENCE TO RELATED APPLICATION

This application is a National Stage of International Application No. PCT/CN2019/111049, filed on Oct. 14, 2019, which claims priority to Chinese Patent Application No. 201811284003.7, filed on Oct. 31, 2018, both of which are hereby incorporated by reference in their entireties.

TECHNICAL FIELD

This application relates to the field of secondary battery technologies, and in particular, to a negative electrode plate, a secondary battery using the negative electrode plate, a battery module, a battery pack, and an apparatus.

BACKGROUND

Secondary batteries have been widely used in recent years due to their advantages of a high energy density, a high operating voltage, a long service life, and low self-discharge. In addition, with increasing popularity of electromobiles, demands for secondary batteries are also experiencing an explosive growth. However, at the same time, there are several problems that still bother consumers: safety, costs, and endurance mileage.

An increase in the endurance mileage mainly depends on an increase in energy density of a battery cell. There are typically two ways to resolve this problem: (1) thickening a coating of an electrode plate to increase capacity per unit area of an active substance, so as to increase the energy density; (2) using an active substance with a high gram capacity, so that energy density of a battery cell can be higher when thickness of an electrode plate is not changed. However, there are still problems with the foregoing two schemes. For example, after a coating thickness is increased, polarization of a battery is severe, affecting cycle life of a battery cell. After the gram capacity (a negative graphite material) is increased, a lithiation/dilithiation capability of the negative graphite material becomes poorer. If a charging rate is relatively large, lithium ions released from a positive electrode cannot be intercalated into a negative material in a timely manner, metal lithium therefore precipitates on a surface of an electrode plate, leading to side reactions and producing a large quantity of by-products. This results in a drastic capacity decrease during cycling and even causes a safety issue.

SUMMARY

In view of the problems in the Background, this application provides a negative electrode plate, a secondary battery, a battery module, a battery pack, and an apparatus. The secondary battery has a high energy density, a long cycle life, and fast charging performance.

To achieve the objective of this application, a first aspect of this application provides a negative electrode plate. The negative electrode plate includes a negative current collector, a first active substance layer disposed on at least one surface of the negative current collector, and a second active substance layer disposed on the first active substance layer, where the first active substance layer includes a first negative active substance, and the second active substance layer includes a second negative active substance; and in the negative electrode plate, the following relationships are satisfied: $3.5 \leq A/B \leq 10.0$, and $6.5 \leq C/D \leq 23.0$, where A is gram capacity of the first negative active substance;

B is thickness of the first active substance layer;

C is gram capacity of the second negative active substance; and

D is thickness of the second active substance layer.

A second aspect of this application provides a secondary battery, including the negative electrode plate in the first aspect of this application.

A third aspect of this application provides a battery module, including the secondary battery in the second aspect of this application.

A fourth aspect of this application provides a battery pack, including the battery module in the third aspect of this application.

A fifth aspect of this application provides an apparatus, including the secondary battery in the second aspect of this application, where the secondary battery is used as a power source of the apparatus.

Preferably, the apparatus includes a mobile device, an electric vehicle, an electric train, a satellite, a ship, and an energy storage system.

Compared with the prior art, this application includes at least the following beneficial effects:

The negative electrode plate of this application includes a structure of two active substance layers, and a thickness of each active substance layer and gram capacity of an active substance in each active substance layer are adjusted during design, thereby obtaining a secondary battery that achieves a balance between high energy density, long cycle life, and fast charging performance.

The battery module, the battery pack, and the apparatus in this application include the secondary battery, and therefore have at least the same advantages as the secondary battery.

Figure 1:
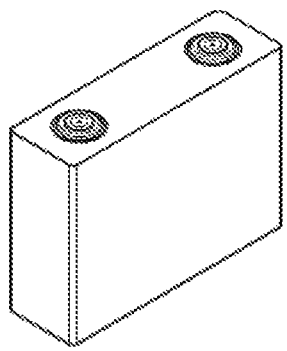
FIG. 1 is a schematic diagram of an embodiment of a secondary battery.

Reference numerals in the accompanying drawings are described as follows:

1. battery pack;
2. upper cabinet body;
3. lower cabinet body;
4. battery module; and
5. secondary battery.

DESCRIPTION OF EMBODIMENTS

The following describes in detail the negative electrode plate, the secondary battery, the battery module, the battery pack, and the apparatus in this application.

First, the negative electrode plate provided in the first aspect of this application is described. The negative electrode plate comprises a negative current collector, a first active substance layer disposed on at least one surface of the negative current collector, and a second active substance layer disposed on the first active substance layer;

wherein the first active substance layer comprises a first negative active substance, and the second active substance layer comprises a second negative active substance; and in the negative electrode plate, the following relationships are satisfied: $3.5 \leq A/B \leq 10.0$, and $6.5 \leq C/D \leq 23.0$, where A is gram capacity of the first negative active substance;

B is thickness of the first active substance layer;

C is gram capacity of the second negative active substance; and

D is thickness of the second active substance layer.

Preferably, in the negative electrode plate of this application, $6.5 \leq A/B \leq 8.5$.

Preferably, in the negative electrode plate of this application, $8.0 \leq C/D \leq 11.0$.

The inventors of this application have found that, under same raw materials and same processing technique, a negative active substance with larger gram capacity means a negative active substance with a crystal structure that is closer to the complete layered structure of ideal graphite, and that has a higher degree of ordering, fewer defects, thereby resulting in fewer side reactions and fewer negative active substances needed for a battery having an expected capacity. Therefore, larger gram capacity of the negative active substance better helps improve energy density of the battery. However, when the gram capacity of the negative active substance is excessively large, a spacing between graphite material layers is excessively small, solid-phase diffusion resistance of active ions inside a material is relatively large, and it is difficult for the active ions to migrate into and out the negative active substance, thereby degrading high-rate charging capability of the battery.

The inventors of this application have further found that smaller thickness of an active substance layer of the negative electrode plate allows better infiltration of electrolyte into the negative electrode plate and faster liquid-phase conduction of active ions in the electrode plate. As a result, during long-term cycling of the battery, polarization of the battery is not significantly increased, and less side reactions occur, thereby reducing safety issues caused by formation of lithium dendrites on a surface of a negative electrode. However, excessively small thickness of the layer imposes a high requirement on a battery cell manufacturing process, and causes that the electrode plate is prone to exhibit "scratches", resulting in poor appearance. In addition, if thickness of a battery cell is excessively small, capacity per unit area of the electrode plate is undesirably small, greatly affecting energy density of the battery.

If an optimization is independently made from the perspective of either gram capacity or thickness of an active substance layer of the electrode plate, great limitations are present to achieve a secondary battery with high energy density, long cycle life, and fast charging performance at the same time.

Through extensive research, the inventors of this application have found that by designing a negative electrode plate with a two-layer structure, and adjusting a ratio of thickness of an active substance layer to gram capacity of a negative active substance so that the negative electrode plate satisfies the following relationships: $3.5 \leq A/B \leq 10.0$, and $6.5 \leq C/D \leq 23.0$, the battery can have high energy density, long cycle life, and fast charging at the same time.

In the negative electrode plate designed in this application, the first negative active substance in the first active substance layer has high gram capacity. As a result, on the one hand, with the same thickness, higher capacity can be provided, so that capacity per unit area is increased. On another hand, higher gram capacity of the negative active substance means smaller mass of an active substance required to achieve same capacity per unit area, and higher energy density of a battery cell. If A/B is less than 3.5, it indicates that the gram capacity of the first active substance is undesirably low or the thickness of the first active substance layer is excessively large. In case of A/B less than 3.5, with the same capacity per unit area, the quantity of active sites on a material surface increases. In addition, the increased thickness of the active substance layer also causes an extended liquid transmission path of active ions, and increased resistance, thereby resulting in an increase in polarization and side reactions, and further affecting cycle life of battery cell. If A/B is greater than 10.0, it indicates that the gram capacity of the first active substance is undesirably large or the thickness of the active substance layer is excessively small. Higher gram capacity indicates a smaller spacing between negative active substance layers, hindering solid-phase diffusion of active ions and affecting fast charging capability of the battery. In addition, significantly small thickness of the electrode plate imposes a high requirement on a battery cell manufacturing process, and causes that the electrode plate is prone to exhibit "scratches", resulting in poor appearance and affecting performance of battery cells.

In the negative electrode plate designed in this application, the second negative active substance in the second active substance layer has relatively small gram capacity. Correspondingly, a spacing between negative active substance layers is larger, solid-phase conduction of active ions is easier, and the active ions are more easily reduced in high-rate charging, thereby reducing formation of dendrites on a surface of a negative electrode. If C/D is less than 6.5, it indicates that the thickness of the second active substance layer is excessively large or the gram capacity of the active substance is excessively small. In the case of C/D less than 6.5, the active substance has excessively low degree of ordering, an increased quantity of defects in active substance crystals, and enhanced surface activity. As a result, during cycling, an SEI film is repeatedly broken and repaired. In this process, more active lithium is consumed, causing a decline in a battery capacity. In addition, the thickness of the electrode plate is excessively large, so that a transmission path of active ions is excessively long, affecting fast charging capability of the battery. If C/D is greater than 23.0, it indicates that the gram capacity of the second active substance is excessively large or the thickness of the second active substance layer is excessively small. Excessively larger gram capacity indicates a smaller spacing between crystal faces of the material, so that resistance of active ions to migrating into and out the active substance increases, and it is also likely to increase a volume expansion ratio of the material. This affects fast charging capability of the battery and structural stability of the material.

In some embodiments of this application, a lower limit of A/B may be 5.5, 6.0, 6.5, or 7.0, and an upper limit of A/B may be 7.5, 8.0, 8.5, 9.0, 9.5, or 10.0.

In some embodiments of this application, a lower limit of C/D may be 6.5, 7.0, 7.5, 8.0, 8.5, 9.0, or 10.0, and an upper limit of C/D may be 11.0, 12.0, 13.0, 14.0, 15.0, 18.0, 20.0, or 23.0.

Preferably, in the negative electrode plate of this application, the gram capacity A of the first negative active substance is greater than the gram capacity C of the second negative active substance. More preferably, in the negative electrode plate, $0.70 \leq C/A \leq 0.98$. When the second negative active substance has smaller gram capacity than the first negative active substance, a spacing between active substance layers is larger, thereby facilitating fast intercalation and de-intercalation of active ions, and improving fast charging performance of the battery. In addition, the gram capacity of the first active substance is larger, so that the battery can have smaller thickness of the active substance layer while achieving same energy density. This better facilitates diffusion of active ions, thereby further improving cycle life of the battery.

Preferably, in the negative electrode plate of this application, the thickness B of the first active substance layer is greater than or equal to the thickness D of the second active substance layer. Preferably, in the negative electrode plate, $0.2 \leq D/B \leq 1.0$. During cycling of the battery, if the thickness of the second active substance layer is smaller, active ions can be intercalated into the first active substance layer through the second active substance layer in a shorter time, thereby reducing lithium precipitation caused by accumulation of active ions on a surface of the electrode plate. This can further improve the fast charging performance of the battery.

Preferably, in the negative electrode plate of this application, $C/D \geq A/B$. The gram capacity of the second active substance is larger, or the thickness of the second active substance layer is smaller, so that active ions released from positive electrode can quickly pass through the second active substance layer to reach the first active substance layer, thereby reducing safety issues resulting from dendrites formed due to accumulation of active ions on the surface of the electrode plate.

Preferably, in the negative electrode plate of this application, the gram capacity A of the first negative active substance satisfies the following relationship: 355 mAh/g≤A≤380 mAh/g, preferably, 360 mAh/g≤A≤375 mAh/g.

Preferably, in the negative electrode plate of this application, the thickness B of the first active substance layer satisfies the following relationship: 35 μm≤B≤105 μm, preferably, 40 μm≤B≤60 μm.

Preferably, in the negative electrode plate of this application, the gram capacity C of the second negative active substance satisfies the following relationship: 250 mAh/g≤A≤350 mAh/g, preferably, 300 mAh/g≤A≤345 mAh/g.

Preferably, in the negative electrode plate of this application, the thickness D of the second active substance layer satisfies the following relationship: 15 μm≤D≤55 μm, preferably, 20 μm≤D≤40 μm.

Preferably, in the negative electrode plate of this application, the first negative active substance and the second negative active substance are independently selected from one or more of artificial graphite, natural graphite, carbonaceous mesophase spherules, soft carbon, and hard carbon.

Preferably, in the negative electrode plate of this application, a degree of graphitization of the first negative active substance is greater than a degree of graphitization of the second negative active substance.

A higher degree of graphitization of the first active substance means a higher degree of ordering of the active substance, fewer defects such as stacking faults and dislocations in crystals, and lower surface activity, so that it is easy to form a stable and dense SEI film during cycling, helping improve cycle performance. A lower degree of graphitization of the second active substance means a larger spacing between crystal faces of the material, facilitating migration into and out of active ions in the active substance, reducing the resistance to migrate, and reducing accumulation of active ions on the surface of the electrode plate that affects the fast charging capability of the battery. Therefore, it is ensured that the degree of graphitization of the first negative active substance is greater than that of the second negative active substance. This can ensure not only required energy density of battery cells, but also fast charging capability of the battery cells.

A second aspect of this application provides a secondary battery, comprising a positive electrode plate, a negative electrode plate, a separator, and an electrolyte, wherein the negative electrode plate is the negative electrode plate provided in the first aspect of this application.

In the secondary battery in the second aspect of this application, the positive electrode plate comprises a positive current collector, and a positive membrane that is provided on at least one surface of the positive current collector and that comprises a positive active substance.

In the secondary battery in the second aspect of this application, the type of the positive active substance is not specifically limited, and the positive active substance may be a well-known conventional material that can be used as a positive active substance for a secondary battery in existing batteries. For example, the positive active substance may be selected from lithium cobalt oxide, lithium nickel oxide, lithium manganese oxide, lithium nickel manganese oxide, lithium nickel cobalt manganese oxide, lithium nickel cobalt aluminum oxide, olivine-type li-contained phosphate. One type of these positive active substances may be used alone, or two or more types may be used in combination. Preferably, the positive active substance is selected from one or more of $LiCoO_2$, $LiNiO_2$, $LiMnO_2$, $LiMn_2O_4$, $LiNi_{1/3}Co_{1/3}Mn_{1/3}O_2$ ($NCM_{333}$), $LiNi_{0.5}Co_{0.2}Mn_{0.3}O_2$ ($NCM_{523}$), $LiNi_{0.6}Co_{0.2}Mn_{0.2}O_2$ ($NCM_{622}$), $LiNi_{0.8}Co_{0.1}Mn_{0.1}O_2$ ($NCM_{811}$), $LiNi_{0.85}Co_{0.15}Al_{0.05}O_2$, LiFePO4 (LFP), and $LiMnPO_4$.

In the secondary battery in the second aspect of this application, the type of the separator is not specifically limited, and the separator may be, but not limited to, any separator materials used in existing batteries, for example, polyethylene, polypropylene, polyvinylidene fluoride, and a multilayer composite film thereof.

In the secondary battery in the second aspect of this application, the electrolyte comprises an electrolyte salt and an organic solvent. Specific types and compositions of the electrolyte salt and the organic solvent are not specifically limited, and may be selected according to actual needs. The electrolyte may further comprise an additive. The type of the additive is not particularly limited, and the additive may be a negative film-forming additive, a positive film-forming additive, or an additive that can improve specific performance of the battery, for example, an additive for improving overcharge performance of the battery, an additive for improving high-temperature performance of the battery, or an additive for improving low-temperature performance of the battery.

A third aspect of this application provides a battery module, comprising any one or more of the secondary batteries in the second aspect of this application.

Further, the quantity of secondary batteries included in the battery module may be adjusted based on application and capacity of the battery module.

Figure 2:
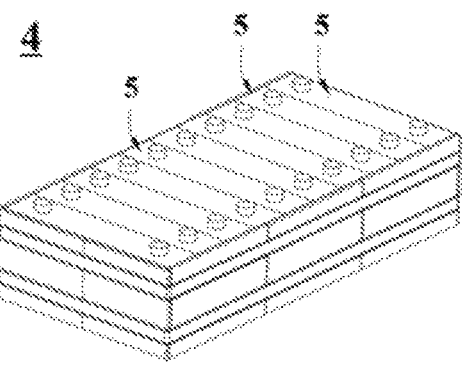
FIG. 2 is a schematic diagram of an embodiment of a battery module.

In some embodiments, referring to FIG. 1 and FIG. 2, in the battery module 4, a plurality of secondary batteries 5 may be sequentially arranged along a length direction of the battery module 4; or certainly, may be arranged in any other manner. Further, the plurality of secondary batteries 5 may be fixed by using fasteners.

Optionally, the battery module 4 may further comprise a housing with an accommodating space, and the plurality of secondary batteries 5 are accommodated in the accommodating space.

A fourth aspect of this application provides a battery pack, comprising any one or more of the battery modules in the third aspect of this application. In other words, the battery pack comprises any one or more of the secondary batteries in the first aspect of this application.

The quantity of battery modules in the battery pack may be adjusted based on application and capacity of the battery pack.

Figure 3:
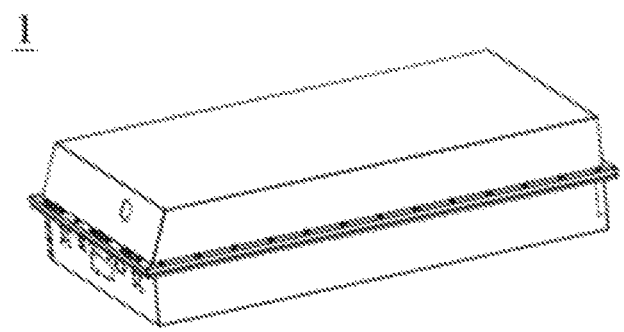
FIG. 3 is a schematic diagram of an embodiment of a battery pack.
Figure 4:
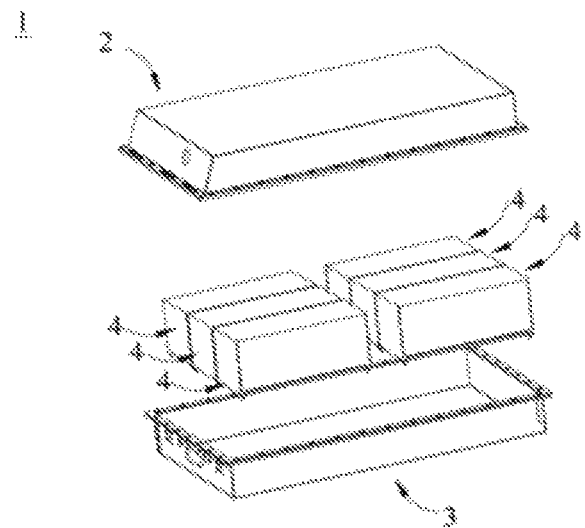
FIG. 4 is an exploded diagram of FIG. 3.

In some embodiments, referring to FIG. 3 and FIG. 4, the battery pack 1 may comprise a battery cabinet and a plurality of battery modules 4 disposed in the battery cabinet. The battery cabinet comprises an upper cabinet body 2 and a lower cabinet body 3. The upper cabinet body 2 can cover the lower cabinet body 3 to form an enclosed space for accommodating the battery modules 4. The plurality of battery modules 4 may be arranged in the battery cabinet in any manner.

A fifth aspect of this application provides an apparatus, comprising any one or more of the secondary batteries in the first aspect of this application. The secondary battery may be used as a power source of the apparatus.

Preferably, the apparatus may be, but not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

Figure 5:
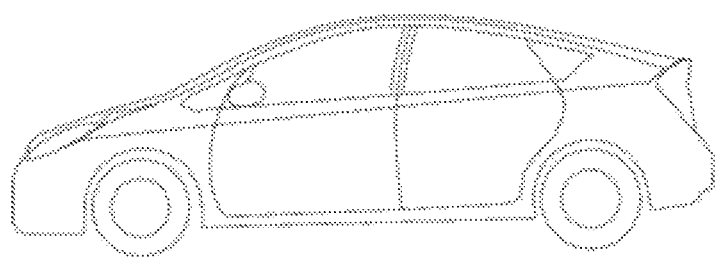
FIG. 5 is a schematic diagram of an embodiment of an apparatus using a secondary battery as a power source.

For example, FIG. 5 shows an apparatus comprising the secondary battery in this application. The apparatus is a full electric vehicle, a hybrid electric vehicle, a plug-in hybrid electric vehicle, or the like. The secondary battery in this application supplies power to the apparatus.

The battery module, the battery pack, and the apparatus as described above comprise the secondary battery provided in this application, and therefore have at least the same advantages as the secondary battery. Details are not described herein again.

The following uses a lithium-ion battery as an example to further describe this application with specific embodiments and reference embodiments. These embodiments are merely intended to describe this application, and this application is not limited to the following embodiments. Any modification or equivalent replacement of the technical solutions of this application without departing from the scope of the technical solutions of this application shall fall within the protection scope of this application.

Full Battery Performance Evaluation

Batteries in Examples and Comparative Examples were all prepared according to the following method.

Positive electrode plate: An active substance $LiNi_{0.8}Mn_{0.1}Co_{0.1}O_2$ ($NCM_{811}$), a conductive agent acetylene black, and a binder polyvinylidene fluoride (PVDF) in an N-methylpyrrolidone solvent system based on a weight ratio of 96.8:2.2:1 were fully stirred and evenly mixed. The resulting mixture was applied onto an aluminum foil, followed by drying and cold pressing, to obtain a positive electrode plate.

Negative electrode plate: First negative active substance (see Table 1 for details), Super P, sodium carboxymethyl cellulose, and a styrene-butadiene rubber (SBR) latex based on a weight ratio of 96.2:0.8:1.2:1.8 were mixed to obtain a first negative active substance slurry. The slurry was applied onto both surfaces of a current collector (a copper foil) to obtain first active substance layers. Second negative active substance (see Table 1 for details), Super P, sodium carboxymethyl cellulose, and a styrene-butadiene rubber (SBR) latex based on a weight ratio of 96.2:0.8:1.2:1.8 were mixed to obtain a second negative active substance slurry. The slurry was applied onto the first active substance layers to obtain second active substance layers. After cold pressing and cutting, a negative electrode plate was obtained.

Separator: APE porous polymer film was used as a separator.

Electrolyte: Ethylene carbonate (EC), ethyl methyl carbonate (EMC), and diethyl carbonate (DEC) based on a volume ratio of 3:6:1 were mixed. Dried lithium salt $LiPF_6$ was then fully dissolved in the mixed organic solvent, to obtain an electrolyte in a concentration of 1 mol/L.

Full battery preparation: The positive electrode plate, the separator, and the negative electrode plate were stacked in order, so that the separator was placed between the positive and negative electrodes, and has an effect of separation. Then the stack was wound to obtain a bare battery. The bare battery was placed in an outer packaging case. Then the prepared electrolyte was injected into the dried bare battery. After steps including vacuum packaging, standing, forming, and shaping, a lithium-ion secondary battery was obtained.

Batteries in Examples 2 to 13 and Comparative Examples 1 to 6 were all prepared according to a method similar to that in Example 1, with specific differences as shown in Table 1. Table 1 showed parameters in Examples 1 to 13 and Comparative Examples 1 to 6.

TABLE 1

| No. | Type of first active substance | Degree of graphitization of first active substance, % | A (mAh/g) | B (μm) | Type of second active substance | Degree of graphitization of second active substance, % | C (mAh/g) | D (μm) |
|---|---|---|---|---|---|---|---|---|
| Example 1 | Artificial | 96 | 365 | 40 | Artificial | 93 | 340 | 40 |
| Example 2 | Artificial | 96 | 365 | 45 | Artificial | 93 | 340 | 35 |
| Example 3 | Artificial | 96 | 365 | 50 | Artificial | 93 | 340 | 30 |
| Example 4 | Artificial | 96 | 365 | 55 | Artificial | 93 | 340 | 25 |
| Example 5 | Artificial | 96 | 365 | 60 | Artificial | 93 | 340 | 20 |
| Example 6 | Artificial | 96 | 360 | 50 | Artificial | 94 | 345 | 35 |
| Example 7 | Artificial | 96 | 365 | 50 | Artificial | 92 | 335 | 35 |
| Example 8 | Artificial | 98 | 370 | 50 | Artificial | 90 | 325 | 35 |
| Example 9 | Artificial | 98 | 375 | 50 | Artificial | 88 | 300 | 35 |
| Example 10 | Artificial | 98 | 375 | 40 | Artificial | 93 | 340 | 20 |
| Example 11 | Artificial | 98 | 375 | 100 | Artificial | 93 | 340 | 50 |
| Example 12 | Natural | 98 | 370 | 50 | Artificial | 93 | 340 | 35 |
| Example 13 | Natural | 98 | 375 | 50 | Artificial | 93 | 340 | 35 |

TABLE 1-continued

| No. | Type of first active substance | Degree of graphitization of first active substance, % | A (mAh/g) | B (μm) | Type of second active substance | Degree of graphitization of second active substance, % | C (mAh/g) | D (μm) |
|---|---|---|---|---|---|---|---|---|
| Comparative Example 1 | Artificial | 96 | 365 | 35 | Artificial | 95 | 340 | 40 |
| Comparative Example 2 | Artificial | 96 | 365 | 110 | Artificial | 93 | 340 | 20 |
| Comparative Example 3 | Artificial | 96 | 365 | 50 | Artificial | 80 | 200 | 30 |
| Comparative Example 4 | Artificial | 96 | 365 | 50 | Artificial | 95 | 355 | 15 |
| Comparative Example 5 | Artificial | 95 | 355 | 105 | Artificial | 85 | 250 | 50 |
| Comparative Example 6 | Artificial | 98 | 380 | 35 | Artificial | 94 | 350 | 15 |

In the table, A represents gram capacity of first negative active substance, B represents thickness of first active substance, C represents gram capacity of second negative active substance, and D represents thickness of second active substance layer.

Battery Performance Test (1) Cycle Performance Test

Full battery cycle performance tests in Examples and Comparative Examples were all performed according to the following method comprising the steps of:

Performing at the first time charging and discharging at 25° C., and performing constant-current and constant-voltage charging at a charge current of 1.0 C (that is, a current value of a theoretical capacity is completely discharged within 1 hour) until an upper-limit voltage was 4.2 V; Then performing constant-current discharging at a discharge current of 1.0 C until a final voltage was 2.8 V; and recording a discharge capacity at the first cycle; Then performing repeatedly charge and discharge cycling.

Capacity retention rate after cycling=(discharge capacity at the $n^{th}$ cycle/discharge capacity at the first cycle)×100

(2) Lithium Precipitation Rate Test

Lithium precipitation rate was tested by the following steps of: Performing a charge and discharge test at 25° C., and performing constant-current discharging at a discharge current of 1.0 C (that is, a current value of a theoretical capacity is completely discharged within 1 hour) until a voltage was 2.8 V; Then performing constant-current charging at a charge current of 1.0 C until a voltage was 4.2 V, and then performing constant-voltage charging until a current was 0.05 C. At this point, the battery was in a fully charged state. Placing the fully charged battery still for 5 min, and performing constant-current discharging to 2.8 V at a discharge current of 1.0 C. At this point, discharge capacity was an actual capacity of the battery at 1.0 C, and denoted as C0. Then charging the battery to 4.2 V at a constant current of xC0, then performing constant-voltage charging until a current was 0.05 C0, placing the battery still for 5 min, disassembling the battery, observing lithium precipitation status on an interface, adjusting a charging rate until lithium precipitation occurred, and reporting the adjusted charging rate as lithium precipitation rate.

(3) Cyclic Expansion Rate Test

Cyclic expansion rate was tested by the following steps of: Performing at the first time charging and discharging at 45° C., and performing constant-current and constant-voltage charging at a charge current of 1.0 C (that is, a current value of a theoretical capacity is completely discharged within 1 hour) until an upper-limit voltage was 4.2 V. Then performing constant-current discharging at a discharge current of 1.0 C until a final voltage was 2.8 V, and recording the discharge capacity at the first cycle. Then performing repeatedly charge and discharge cycling for 600 times, followed by removing the battery, and stopping the test.

Performing a charge test at 25° C.; Performing constant-current charging at a charge current of 1.0 C (that is, a current value of a theoretical capacity is completely discharged within 1 h) until a voltage was 4.2 V, and then performing constant-voltage charging until a current was 0.05 C. At this point, the battery was in a fully charged state. Disassembling a battery cell, taking out a negative electrode plate, and recording thickness $H_{600}$ of the negative electrode plate.

Expansion rate after 600 cycles=$[(H_{600}-H_0)/(H_1-H_0)-1]\times 100\%$.

$H_0$ is thickness of a copper foil, and $H_1$ is thickness of the electrode plate after 1 cycle of test.

According to the foregoing methods, cycle performance, a lithium precipitation rate, and an expansion rate after 600 cycles of the batteries in the embodiments and the reference embodiments were measured.

For details about test results of Examples and Comparative Examples, see

Table 2. Table 2 showed performance test results of Examples 1 to 13 and Comparative Examples 1 to 6.

TABLE 2

| No. | A/B | C/D | Capacity retention rate after 1000 cycles, % | Lithium precipitation rate | Expansion rate after 600 cycles |
|---|---|---|---|---|---|
| Example 1 | 9.1 | 8.5 | 90 | 1.4 C | 29% |
| Example 2 | 8.1 | 9.7 | 92 | 1.6 C | 30% |
| Example 3 | 7.3 | 11.3 | 91 | 1.5 C | 28% |
| Example 4 | 6.6 | 13.6 | 90 | 1.4 C | 32% |
| Example 5 | 6.1 | 17.0 | 89 | 1.3 C | 34% |
| Example 6 | 7.2 | 9.9 | 94 | 2.0 C | 28% |
| Example 7 | 7.3 | 9.6 | 95 | 2.1 C | 26% |
| Example 8 | 7.4 | 9.3 | 93 | 1.8 C | 24% |
| Example 9 | 7.5 | 8.6 | 89 | 1.5 C | 30% |
| Example 10 | 9.4 | 17.0 | 86 | 1.3 C | 34% |
| Example 11 | 3.8 | 6.8 | 85 | 1.4 C | 33% |
| Example 12 | 7.4 | 9.7 | 88 | 1.5 C | 36% |
| Example 13 | 7.5 | 9.7 | 87 | 1.5 C | 38% |
| Comparative Example 1 | 10.4 | 8.5 | 82 | 0.7 C | 44% |
| Comparative Example 2 | 3.3 | 17.0 | 84 | 0.5 C | 45% |

TABLE 2-continued

| No. | A/B | C/D | Capacity retention rate after 1000 cycles, % | Lithium precipitation rate | Expansion rate after 600 cycles |
|---|---|---|---|---|---|
| Comparative Example 3 | 7.3 | 6.7 | 80 | 1.0 C | 40% |
| Comparative Example 4 | 7.3 | 23.7 | 83 | 0.5 C | 46% |
| Comparative Example 5 | 3.4 | 5.0 | 70 | 0.6 C | 43% |
| Comparative Example 6 | 10.9 | 23.3 | 75 | 0.4 C | 47% |

In the table, A represents gram capacity of the first negative active substance, B represents thickness of the first active substance layer, C represents gram capacity of the second negative active substance, and D represents thickness of the second active substance layer.

In Examples 1 to 13, ratios of thickness of each active substance layer to gram capacity of the active substance layer were properly adjusted, so that when $3.5 \leq A/B \leq 10.0$ and $8.0 \leq C/D \leq 23.0$, the batteries were characterized by all of long cycle life, high-rate charging, and low expansion rate.

Compared with Examples 1 to 13, in Comparative Examples 1 to 6, the batteries were not in the given ranges of A/B and C/D at the same time, and therefore the batteries were not characterized by all of a long cycle life, a high energy density, and high-rate charging.

In Comparative Examples 1 and 2, where A/B was within the given range but C/D was not within the given range, the batteries exhibited deteriorated cycle, lithium precipitation, and expansion performance. In Comparative Example 1, the thickness of the first negative active substance layer was not within the given range of 35 μm-105 μm, and the thickness of the electrode plate was excessively small. This was likely to cause "scratches", thereby greatly affecting appearance of the electrode plate when the gram capacity of the active substance was within the given specification range, and further affecting cycle performance of the battery. In addition, if the thickness of the first active substance layer was excessively small, energy density of the battery was affected. In Comparative Example 2, the thickness of the first negative active substance layer was not within the given range of 35-105 μm. If the thickness of the electrode plate was excessively large, infiltration of an electrolyte into the electrode plate was difficult, resulting in an increase in a transmission resistance of active ions and an increase in polarization of the battery. This leaded to uneven local current distribution in the battery and caused lithium precipitation, thereby affecting cycle life and lithium precipitation performance of the battery.

In Comparative Example 3 and 4, where A/B was not within the given range and C/D was within the given range, cycle, lithium precipitation, and expansion performance of the battery were significantly affected. In Comparative Example 3, the gram capacity of the second negative active substance was not within the selected range of 250 mAh/g-350 mAh/g, and the gram capacity of the active substance was relatively small, resulting in a quite low energy density of the battery cell when the thickness of the electrode plate was within the given specification range. In addition, the active substance has excessively low degree of ordering, an increased quantity of defects in active substance crystals, and enhanced surface activity. As a result, during cycling, an SEI film was repeatedly broken and repaired, causing a decline in a battery capacity, and affecting cycle life of the battery when the thickness of the electrode plate was within the given specification range. In Comparative Example 4, the gram capacity of the second negative active substance was not within the selected range of 250 mAh/g-350 mAh/g, the gram capacity of the active substance was excessively large, and a spacing between active substance layers was relatively small, thereby affecting solid transmission of active ions, and affecting lithium precipitation and expansion performance of the battery when the thickness of the electrode plate was within the given specification range.

In Comparative Example 5 and 6, although the gram capacity of the active substance and the thickness of the active substance layer were within the given ranges, neither A/B nor C/D was within the given range, so cycle, lithium precipitation, and expansion performance of the battery were affected.

Although this application is disclosed above with preferred embodiments, these embodiments are not intended to limit the claims. Any person skilled in the art can make several possible changes and modifications without departing from the concept of this application. Therefore, the protection scope of this application shall be subject to the scope demarcated by the claims of this application.

What is claimed is:

1. A secondary battery, comprising a positive electrode plate, a negative electrode plate, a separator, and an electrolyte, wherein the negative electrode plate comprises:
   a negative current collector, a first active substance layer disposed on at least one surface of the negative current collector, and a second active substance layer disposed on the first active substance layer,
   wherein the first active substance layer comprises a first negative active substance, and the second active substance layer comprises a second negative active substance; and
   in the negative electrode plate, the following relationships are satisfied: $3.5 \leq A/B \leq 10.0$, and $6.5 \leq C/D \leq 23.0$ and $A > C$, wherein
   A is gram capacity of the first negative active substance, in mAh/g;
   B is thickness of the first active substance layer, in μm;
   C is gram capacity of the second negative active substance, in mAh/g; and
   D is thickness of the second active substance layer, in μm.

2. The secondary battery according to claim 1, wherein in the negative electrode plate, $6.5 \leq A/B \leq 8.5$.

3. The secondary battery according to claim 1, wherein in the negative electrode plate, $8.0 \leq C/D \leq 11.0$.

4. The secondary battery according to claim 1, wherein in the negative electrode plate, $0.70 \leq C/A \leq 0.98$.

5. The secondary battery according to claim 1, wherein in the negative electrode plate, $B \geq D$.

6. The secondary battery according to claim 5, wherein in the negative electrode plate, $0.2 \leq D/B \leq 1.0$.

7. The secondary battery according to claim 1, wherein in the negative electrode plate, $C/D \geq A/B$.

8. The secondary battery according to claim 1, wherein in the negative electrode plate, 355 mAh/g ≤ A ≤ 380 mAh/g; or
   35 μm ≤ B ≤ 105 μm; or
   250 mAh/g ≤ C ≤ 350 mAh/g; or
   15 μm ≤ D ≤ 55 μm.

9. The secondary battery according to claim 8, wherein in the negative electrode plate, 360 mAh/g ≤ A ≤ 375 mAh/g.

10. The secondary battery according to claim 8, wherein in the negative electrode plate, 40 μm ≤ B ≤ 60 μm.

11. The secondary battery according to claim 8, wherein in the negative electrode plate, 300 mAh/g ≤ C ≤ 345 mAh/g.

12. The secondary battery according to claim 8, wherein in the negative electrode plate, 20 μm≤D≤40 μm.

13. The secondary battery according to claim 1, wherein the first negative active substance and the second negative active substance are independently selected from one or more of artificial graphite, natural graphite, carbonaceous mesophase spherules, soft carbon, and hard carbon.

14. The secondary battery according to claim 13, wherein a degree of graphitization of the first negative active substance is greater than a degree of graphitization of the second negative active substance.

15. The secondary battery according to claim 1, wherein the first negative active substance is selected from one or more of artificial graphite and natural graphite.

16. The secondary battery according to claim 1, wherein the second negative active substance is artificial graphite.

17. A battery module, comprising the secondary battery according to claim 1.

18. A battery pack, comprising the battery module according to claim 17.

19. An apparatus, comprising the secondary battery according to claim 1, wherein the secondary battery is used as a power source of the apparatus.

* * * * *